Jan. 25, 1966     E. G. SCHEIBEL     3,231,251
FROTH DISENGAGEMENT IN GAS-LIQUID CONTACT APPARATUS
Filed May 10, 1962
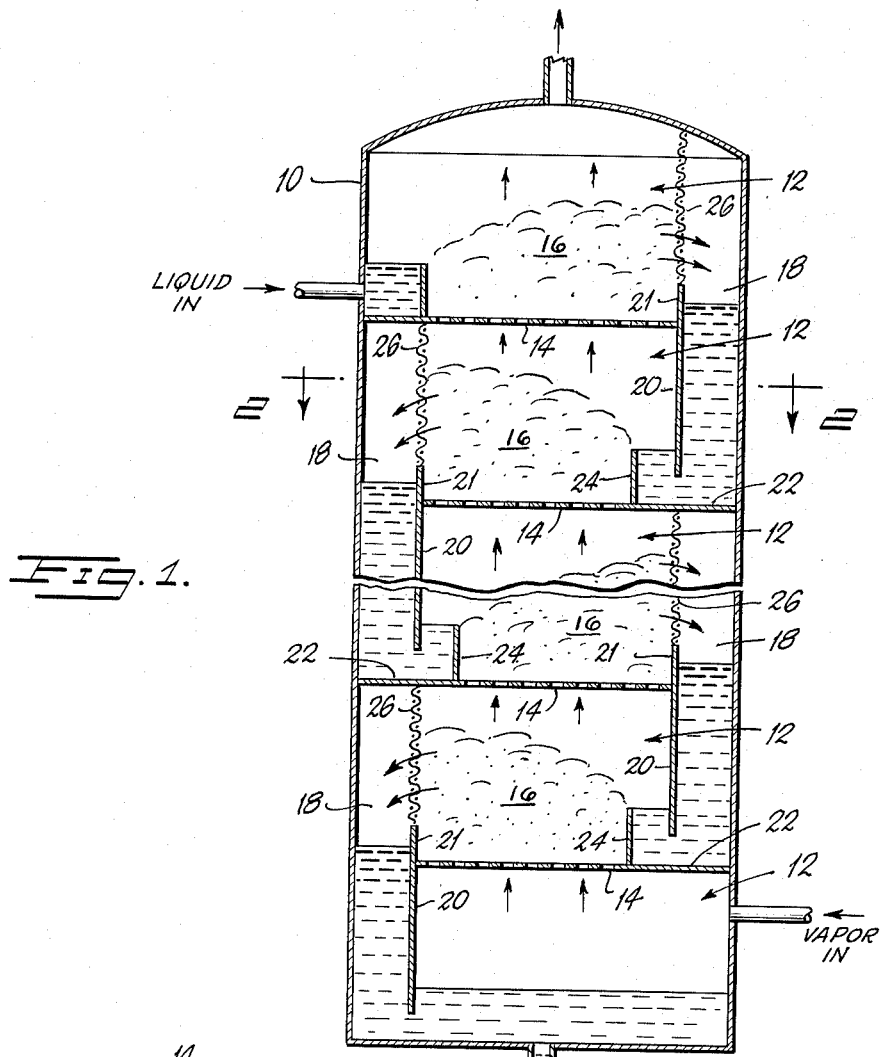
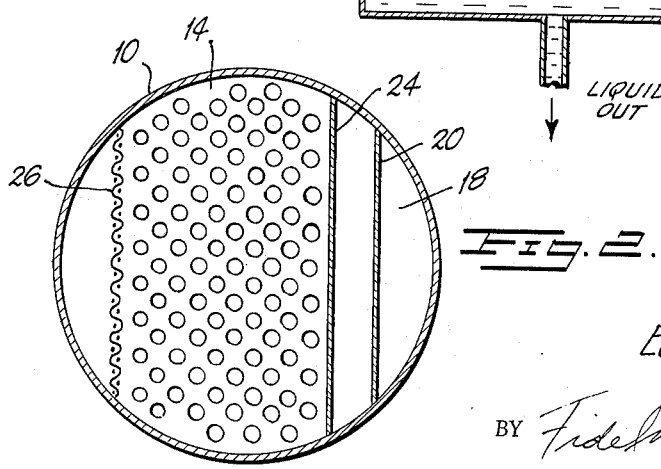
INVENTOR
Edward G. Scheibel
BY *Fridelman and Wolfe*
ATTORNEYS United States Patent Office 3,231,251
Patented Jan. 25, 1966

3,231,251
FROTH DISENGAGEMENT IN GAS-LIQUID CONTACT APPARATUS
Edward G. Scheibel, Montclair, N.J., assignor to York Process Equipment Corporation, West Orange, N.J., a corporation of New Jersey
Filed May 10, 1962, Ser. No. 193,786
4 Claims. (Cl. 261—114)

This invention relates to froth disengagement in gas-liquid contacting columns of the type commonly employed as fractionators, absorbers, desorbers, and the like.

Gas-liquid contacting apparatus, to which practice of the instant invention is applicable, is constructed in the form of a vertically elongated cylinder, to wit a column, containing internally thereof a multiplicity of vertically spaced apart plates or stages. A horizontal or generally horizontal tray structure capable of supporting a small body of liquid constitutes an important structural feature of each plate of the column. Gas or vapor (these terms being employed synonymously) to be contacted enters at the bottom of the column and flows vertically upward through the trays, contacting the liquid on each tray. Liquid enters at the column top and flows down from tray to tray. The actual liquid flow is more zig-zag than the gas flow since the plate structures usually provide for alternating down flow means, i.e. downcomers, first on one side of the column then at a diametrically opposite side of the column (and in some instances alternating central and side downcomers), thereby providing for transverse flow of the liquid across each tray from an entrance area to an exit (downcomer) area zig-zagging, so to speak, from side to side during the downward course of the liquid from the top of the column to the bottom.

The exact details of the plates in the column are subject to numerous variations, particularly with regard to the tray structures, of which perhaps the most common are the bubble cap trays and the perforated plate trays. In addition there are many special tray designs, e.g., the Uniflow tray, the Flexitray, the Koch Cascade tray and the Nutter type of tray. Generally, each of these tray types is adapted for good gas-liquid contact. As a whole the columns constitute an excellent countercurrent contactor for the liquid and gas flowing therethrough.

The art has reached such an advanced state in its provision of efficient tray structures that a real problem exists with regard to separating the gas and liquid in the froth or foam resulting from the gas bubbling up through the body of liquid present on the tray structure. Obviously, only liquid should leave the tray by way of the downflow means and pass to the next lower tray and only gas should pass overhead of the tray structure and up through the perforations or apertures in the next higher tray to once again contact liquid. Passage of froth as such between trays either upward with the gas or downward with the liquid detracts from most efficient operation of the column as a whole. Because by its nature the froth constitutes an expansion in the apparent volume of the liquid therein, passage of froth in a given column means that the column is physically able to handle with reasonable efficiency a reduced amount of liquid compared to no froth passing between trays. This result obtains because any vapor entrained in the tray to tray liquid downflow stream increases the velocity of flow needed to pass a given amount of liquid through the downcomer. Since the pressure drop in a downcomer is very nearly proportional to the square of the liquid velocity, presence of any entrained vapor therein will greatly increase the pressure drop, often to a point where the desired amount of liquid simply will not flow at the head available with the small vertical distance between adjacent trays of a column.

In this connection it should be appreciated that this problem cannot be obviated simply by providing a larger downcomer. Even without consideration of the froth problem, provision of adequate downcomer area is a limiting factor in column design. Published methods for calculating the area of circular downspouts are available (Souders et al., Ind. Eng. Chem., vol. 30, 1938, p. 86). Also, it has been found that the capacity of the downspout decreases appreciably with increasing head over the weir which serves to maintain the liquid level on the tray and to demark the entrance to the downcomer (Perry, Chem. Eng. Handbook, 3rd ed., 1950, pp. 600–601, McGraw-Hill Book Co.). Since the head over the weir varies according to the 2/3 power of the liquid flow as the liquid flow increases, the top downflow area required in the trays does not increase proportionally to the liquid flow rate but varies by a greater amount. All this imposes a most serious limitation in the engineering design of columns for multi-stage countercurrent contacting of a relatively small amount of gas with a large amount of liquid, as would occur in absorption and desorption columns and also in distillation columns where one desires to strip out only a small amount of the liquid feed.

A need exists, therefore, for a way to prevent froth from entering the downcomers, a need which to some extent has been recognized by workers in the art. Many suggestions have been made for improving column operation, but the froth disengagement problem remains essentially unsolved. As an example, one technique suggested to effect froth disengagement has been installation of a splash baffle in front of the top downflow weir, but this expedient serves also to increase the resistance to flow of liquid transversely across the tray. Overall, the result is simply to produce a higher frothing level on the tray, and placement of splash baffles in a column already operating close to its maximum allowable vapor velocity can reduce the liquid handling capacity of the column as a whole. Such splash baffles can, and do, however, serve a useful purpose to improve the efficiency of the individual tray even though under high liquid loads presence of the baffles may well decrease the total liquid capacity.

The object of the instant invention is to provide an uncomplicated yet effective means for disengaging froth before the liquid enters the top of the downcomer.

Briefly stated, the above object is achieved by providing a properly positioned foraminous barrier at the weir through which the liquid on the tray must pass before it can enter the downcomer for flow through to the next lower tray.

For further understanding of the instant invention, reference is now made to the accompanying drawing wherein:

FIGURE 1 diagrammatically illustrates a cross-sectional view of a column containing the froth disengaging features of the instant invention, and FIGURE 2 is a view taken along lines 2—2 of FIGURE 1.

As shown in the drawing, a conventional cylindrical column 10 (perforated tray type) is constructed with means to introduce gas to the bottom of the column and liquid to the top. Exemplarily, therefore, the drawing can be considered to illustrate the plates 12 of a distillation column or an absorption column or a desorption column, and as can be seen from the high froth level, a column operated at a high level of liquid loading.

On each of the plates 12 is a perforated tray 14 disposed transversely across column 10. The trays 14 are spaced apart in alternation along the column in the manner shown by the drawing. The upflowing vapor passes through each perforated tray 14 and intimately contacts the body 16 of liquid resting thereon. As is conventional, the tray perforations permit upflow of vapor but prevent substantial leakage of liquid from tray 14 through to the next lower plate. Essentially all the downflowing liquid enters each plate 12 through downcomer 18 formed, as is conventional, in the arcuate segment of cylindrical column 10 bounded by the column wall and vertically disposed plate 20. The upper portion of plate 20 extends above the level of tray 14 to form an overflow weir 21 which determines how high the body of liquid 16 stands on the tray 14. The plate 20 terminates just above an imperforate barrier plate 22 (on a level with tray 14) which together with an upstanding baffle 24 form the terminus of downcomer 18. The downflowing liquid exiting from downcomer 18 passes up between vertical plate 20 and baffle 24 to flow transversely on to tray 14 whereon it is contacted by upflowing gas passing up through the perforations in tray 14. As shown in the drawing, plates 12 are provided with side to side alternating downcomers 18 so that a zig-zag transverse flow of liquid diametrically across each tray 14 occurs during downward passage of liquid through column 10. In this connection it is noteworthy that the area on the tray 14 for transverse flow is far larger than the downcomer area for downflow.

All of the structure just described is quite conventional, having been shown in the drawing for exemplary purposes in order to illustrate exactly the manner in which the improvement of the instant invention co-acts with conventional practice in the art of liquid-gas contacting devices.

The instant invention provides a froth disengaging gas permeable element 26 positioned across the path the liquid must take in flowing from tray 14 into the downcomer 18, as for example vertically in line with overflow weir 21. Characteristically, the permeable froth disengager 26 must provide a high area of surface for froth impingement thereon yet have a relatively high free space available for the liquid to flow therethrough. Suitably, the froth disengaging element 26 is a crimped wire mesh either woven or knitted, the latter being preferred. Also a multiplicity of layers of wire mesh may be assembled into a single disengager 26 in order to improve the froth disengaging feature. Characteristically the crimped wire mesh of froth disengager 26 serves to break up the froth releasing the gas or vapor from the froth so that it may flow upward through the perforations of next higher tray 14. The defrothed liquid flows through downcomer 18 to the next lower plate 12 and joins the body of liquid 16 already present on its tray 14.

Presence of froth disengager 26 does not particularly affect the quality of the gas-liquid contact which occurs above each perforated tray 14. Its presence does, however, result in far less carry-back of vapor. Also the froth disengaging wire mesh 26 does not in any fashion result in an increased froth level on the individual tray 14, but its froth disengaging action permits an increased amount of liquid to pass through downcomer 18 without at the same time materially affecting the vapor capacity of column 10.

In comparable tests with successive runs on the same column before and after two layers of crimped knitted wire mesh were installed as froth disengaging elements 26, it was found that their installation increased the liquid handling capacity of the column in excess of 50% over that obtained without a froth disengager 26 in the column (at the same rate of vapor throughout). Specifically, a distillation column constructed in accord with the illustration, but without froth disengager 26 was operated at a vapor rate of 4.3 ft. per second over the bubbling area of the trays 14 and with the top downflow area 1" wide. Under these conditions the maximum liquid capacity was 1650 gallons per hour per foot of weir length. However, when the two layers of crimped knitted wire mesh were installed vertically above the overflow weir 21 of downcomers 18, the same column easily handled 2500 gallons per hour per foot of weir length at the same vapor rate.

As has already been indicated, a high area, high free space crimped wire mesh should be employed in the construction of froth disengager 26. In terms of numerical ranges, the free space of the wire mesh should be in excess of 85%, yet the mesh should have at least 80 sq. ft. of surface per cu. ft. of mesh. The specific properties of the knitted wire mesh employed in the above described test was 100 sq. ft. per cu. ft., and a free space of 97%.

While the drawing and the detailed discussion of the instant invention have been almost entirely in terms of the perforated tray, side to side flow type of column, it should be recognized that the invention is at least equally applicable to all other columns, e.g., split flow, bubble cap, etc. In the instance of a perforated tray structure, no horizontal component of motion is imparted to the upflowing vapor. Horizontal movement of liquid or froth over the weir 21 results solely from the liquid flow transversely across tray 14. The instant invention is even more applicable to those types of columns like bubble plate columns and the proprietary types previously named, wherein a transverse motion exists. In the case of bubble plate columns, for example, the vapors issuing from the side of the bubble caps facing the weir have an actual horizontal component of motion toward the weir, and there, if anywhere, the problem of froth disengagement is more critical than in the instance of perforated trays, making the advantages of froth disengagement according to the practice of the instant invention even more pronounced.

In the bubble cap art existence of the froth problem has caused suggestion of such expedients as blanking off the bubble caps facing the weir and introduction of a splash baffle ahead of the weir. These expedients do not achieve the full advantage of froth disengagement attained by the use of the instant froth disengaging wire mesh. Allusion has already been made to the fact that the splash baffle in and of itself does not solve the frothing problem in a manner which permits increased column capacity. The other expedient of blanking off the bubble caps facing the weir serves principally to neutralize or remove some of the tray area from effective liquid gas contact (and thereby allow a region for froth disengagement). On an overall basis the presence of an ineffective area on each plate inside the column as is provided by blanking caps, results in an engineering design requirement for a larger diameter column than would be necessary if all the tray area were available for gas-liquid contact. A specific advantage of froth disengagement through employment of disengager 26 is that it does not increase either the column height or the column diameter. Moreover, in an already constructed installation, addition of the disengager 26 serves to increase the liquid handling capacity of the column without affecting the quality of operation of the given tray (perforated, bubble cap, or other).

While a preferred embodiment of the instant invention has been shown and described above, it should be appreciated that modifications may be made thereto and it is intended, therefore, to receive the broadest possible interpretation of the invention within the scope and spirit of the description hereinabove and of the claims appended hereinafter.

What is claimed is:

1. A vertical column adapted for countercurrent contact of gas with a liquid and containing therein a horizontal series of vertically spaced apart trays, said trays allowing gas flow upward therethrough; means to feed a liquid to the column above the topmost tray; a liquid outlet means from the column beneath the lowest tray; means to feed gas to the column beneath the lowest tray; and gas outlet means from the column above the topmost tray; liquid downflow means associated with each tray for passing liquid down from tray to tray, each tray having an edge exit thereon constituting the entrance to liquid downflow means associated therewith, and an inlet area spaced transversely across the tray from the edge exit thereon constituting the receiving portion outlet of the downflow means associated with the next higher tray whereby the downflow means at adjacent trays are spaced apart transversely of the column and the liquid is made to flow transversely across each tray in its course from liquid inlet to liquid outlet, each tray being uniformly apertured except at the aforementioned inlet area and edge exit, each tray further having associated therewith for froth disengaging a vertically disposed crimped wire mesh positioned at the tray edge entrance to the downflow means, said vertically disposed crimped wire mesh extending completely across the entrance to said downflow means side to side of the tray and top to bottom of the space between trays, whereby the liquid flowing transversely across a tray must traverse the crimped wire mesh before entering the downflow means and pass therethrough to the next lower tray, said crimped wire mesh further being of high area, high free space construction with a free space in excess of 85%.

2. The apparatus of claim 1 wherein a multilayer crimped knitted wire mesh containing in excess of 100 square feet per cubic foot of mesh is employed as the froth disengaging means.

3. The apparatus of claim 1 wherein crimped knitted wire mesh is employed for the froth disengaging means.

4. The column of claim 1 wherein the tray area for transverse flow across the tray is greater than the area of the downflow means for downward flow.

References Cited by the Examiner
UNITED STATES PATENTS

| | | | |
|---|---|---|---|
| 1,878,467 | 9/1932 | Clarke | 261—113 |
| 2,116,933 | 5/1938 | Ragatz | 261—113 XR |
| 2,632,638 | 3/1953 | Turner | 261—95 XR |
| 2,832,578 | 4/1958 | Gilmore | 261—114 |
| 2,973,189 | 2/1961 | Ju Chin Chu | 261—114 |

OTHER REFERENCES

"Metex Mist Eliminators," bulletin of the Metal Textile Corp., Rosselle, New Jersey, received in the U.S. Patent Office, Dec. 12, 1955, 8 pages.

HARRY B. THORNTON, *Primary Examiner.*

HERBERT L. MARTIN, *Examiner.*